(12) United States Patent
Chen et al.

(10) Patent No.: US 9,871,595 B2
(45) Date of Patent: Jan. 16, 2018

(54) DECODING DEVICE AND METHOD FOR ABSOLUTE POSITIONING CODE

(71) Applicant: INDUSTRIAL TECHNOLOGY RESEARCH INSTITUTE, Chutung, Hsinchu (TW)

(72) Inventors: Chien-Wen Chen, Pingtung County (TW); Yung-Chang Chen, New Taipei (TW); Huan-Chi Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/395,843

(22) Filed: Dec. 30, 2016

(65) Prior Publication Data

US 2017/0317761 A1    Nov. 2, 2017

Related U.S. Application Data

(60) Provisional application No. 62/328,599, filed on Apr. 27, 2016.

(30) Foreign Application Priority Data

Oct. 17, 2016   (TW) .............. 105133434 A
Oct. 21, 2016   (TW) .............. 105134040 A

(51) Int. Cl.
*H04B 10/60*       (2013.01)
*H04L 7/00*        (2006.01)

(52) U.S. Cl.
CPC ........... *H04B 10/60* (2013.01); *H04L 7/0075* (2013.01); *H04L 7/0079* (2013.01)

(58) Field of Classification Search
CPC ............ H03K 5/1252; H04L 2209/043; H04L 7/0075; H04L 7/0079; H04B 10/60
(Continued)

(56) References Cited

U.S. PATENT DOCUMENTS 4,079,252 A    3/1978   Brake
4,445,110 A    4/1984   Breslow
(Continued)

FOREIGN PATENT DOCUMENTS

CN     103411540     11/2013
CN     103557878     2/2014
(Continued)

OTHER PUBLICATIONS

Crespo et al., "Reflection optical encoders as three-grating moire systems", Applied Optics, Aug. 1, 2000, vol. 39, No. 22, pp. 3805-3813.
(Continued)

*Primary Examiner* — Don N Vo
(74) *Attorney, Agent, or Firm* — Muncy, Geissler, Olds & Lowe, P.C.

(57)    ABSTRACT

A decoding device for an absolute positioning code is provided. The decoding device includes a linear feedback shift register (LFSR), a lookup table (LUT) circuit, a counter circuit, and a computation circuit. The LFSR includes n registers, for loading the absolute positioning code with a first frequency. The LFSR performs shifting operation according to a clock signal having a second frequency greater than or equal to the first frequency. The LUT circuit outputs a lookup result and a valid flag according to values stored in the n registers. The lookup result has k different data, $k \leq (2^n - 1)$. The counter circuit resets according to the valid flag, and performs counting operation according to the clock signal to generate a counting result. The computation
(Continued)

circuit performs calculation according to the lookup result and the counting result to generate a decoding result when the valid flag indicates valid.

17 Claims, 9 Drawing Sheets

(58) Field of Classification Search
USPC .......................................................... 398/209
See application file for complete search history.

(56) References Cited

U.S. PATENT DOCUMENTS

| | | | |
|---|---|---|---|
| 4,947,166 | A | 8/1990 | Wingate et al. |
| 5,173,693 | A | 12/1992 | Fry |
| 5,689,336 | A | 11/1997 | Huber |
| 5,774,219 | A | 6/1998 | Matsuura |
| 5,799,010 | A * | 8/1998 | Lomp .................... H04B 1/707 370/335 |
| 5,886,352 | A | 3/1999 | Wright et al. |
| 6,472,658 | B2 | 10/2002 | Mayer et al. |
| 6,552,810 | B1 | 4/2003 | Hermann et al. |
| 6,635,863 | B1 | 10/2003 | Nihommori et al. |
| 6,759,647 | B2 | 7/2004 | Ito et al. |
| 6,791,699 | B2 | 9/2004 | Aoki |
| 6,794,637 | B1 | 9/2004 | Holzapfel et al. |
| 6,963,409 | B2 | 11/2005 | Benner et al. |
| 7,470,892 | B2 | 12/2008 | Ohmura et al. |
| 7,608,813 | B1 | 10/2009 | Milvich et al. |
| 7,969,579 | B2 | 6/2011 | Holloway |
| 8,325,066 | B2 | 12/2012 | Kato |
| 8,488,131 | B2 | 7/2013 | Horiguchi |
| 8,994,958 | B2 | 3/2015 | Holzapfel |
| 9,013,710 | B2 | 4/2015 | Hermann |
| 9,303,981 | B2 | 4/2016 | Schoser et al. |
| 2006/0156187 | A1 | 7/2006 | Wu et al. |
| 2007/0186431 | A1 | 8/2007 | Mittmann et al. |
| 2009/0180125 | A1 | 7/2009 | Holloway |
| 2009/0256065 | A1 | 10/2009 | Kusano et al. |
| 2011/0103432 | A1* | 5/2011 | Tangudu ................. G01S 19/21 375/150 |

FOREIGN PATENT DOCUMENTS

| | | |
|---|---|---|
| EP | 0543513 | 5/1993 |
| TW | I405122 | 8/2013 |
| TW | I519906 | 2/2016 |

OTHER PUBLICATIONS

Hopp et al., "A novel diffractive encoding principle for absolute optical encoders", Proc. of SPIE, vol. 8082, Optical Measurement Systems for Industrial Inspection VII, May 27, 2011, 15 pages.
Chu-Chun Tsai, "Research and Development for Absolute Rotary Encoder", thesis for Mingdao University, Jul. 17, 2012, 108 pages.
Chen et al., "A Coding and Decoding Method for the Single-Ring Absolute Optical Encoder", Opto-Electronic Engineering, Jun. 2013, vol. 40, No. 6, 10 pages.
Zhang et al., "Upper Bound of Single-track Gray Codes and the Combined Coding Method of Period 2n", Strategic Technology (IFOST), 2013 8$^{th}$ International Forum on,Jun. 28-Jul. 1, 2013. 5 pages.

* cited by examiner

| Time | R3 | R2 | R1 | R0 |
|---|---|---|---|---|
| | 0 | 0 | 0 | 1 |
| | 1 | 0 | 0 | 0 |
| | 1 | 1 | 0 | 0 |
| | 1 | 1 | 1 | 0 |
| | 1 | 1 | 1 | 1 |
| | 0 | 1 | 1 | 1 |
| | 1 | 0 | 1 | 1 |
| | 0 | 1 | 0 | 1 |
| | 1 | 0 | 1 | 0 |
| | 1 | 1 | 0 | 1 |
| | 0 | 1 | 1 | 0 |
| | 0 | 0 | 1 | 1 |
| | 1 | 0 | 0 | 1 |
| | 0 | 1 | 0 | 0 |
| | 0 | 0 | 1 | 0 |
| | 0 | 0 | 0 | 1 |

| R3 | R2 | R1 | R0 | Position |
|---|---|---|---|---|
| 1 | 0 | 0 | 0 | 0001 |
| 1 | 1 | 0 | 0 | 0010 |
| 1 | 1 | 1 | 0 | 0011 |
| 1 | 1 | 1 | 1 | 0100 |
| 0 | 1 | 1 | 1 | 0101 |
| 1 | 0 | 1 | 1 | 0110 |
| 0 | 1 | 0 | 1 | 0111 |
| 1 | 0 | 1 | 0 | 1000 |
| 1 | 1 | 0 | 1 | 1001 |
| 0 | 1 | 1 | 0 | 1010 |
| 0 | 0 | 1 | 1 | 1011 |
| 1 | 0 | 0 | 1 | 1100 |
| 0 | 1 | 0 | 0 | 1101 |
| 0 | 0 | 1 | 0 | 1110 |
| 0 | 0 | 0 | 1 | 1111 |

FIG. 7

| Address | | | | Data |
|---|---|---|---|---|
| 1 | 0 | 0 | 0 | 00 |
| 0 | 1 | 1 | 1 | 01 |
| 1 | 1 | 0 | 1 | 10 |
| 0 | 1 | 0 | 0 | 11 |

FIG. 8

| R3 | R2 | R1 | R0 | Lookup Result | Valid Flag |
|---|---|---|---|---|---|
| 1 | 0 | 0 | 0 | 00 | 1 |
| 1 | 1 | 0 | 0 | xx | 0 |
| 1 | 1 | 1 | 0 | xx | 0 |
| 1 | 1 | 1 | 1 | xx | 0 |
| 0 | 1 | 1 | 1 | 01 | 1 |
| 1 | 0 | 1 | 1 | xx | 0 |
| 0 | 1 | 0 | 1 | xx | 0 |
| 1 | 0 | 1 | 0 | xx | 0 |
| 1 | 1 | 0 | 1 | 10 | 1 |
| 0 | 1 | 1 | 0 | xx | 0 |
| 0 | 0 | 1 | 1 | xx | 0 |
| 1 | 0 | 0 | 1 | xx | 0 |
| 0 | 1 | 0 | 0 | 11 | 1 |
| 0 | 0 | 1 | 0 | xx | 0 |
| 0 | 0 | 0 | 1 | xx | 0 |

FIG. 9

DECODING DEVICE AND METHOD FOR ABSOLUTE POSITIONING CODE

This application claims the benefit of U.S. provisional application Ser. No. 62/328,599, filed Apr. 27, 2016, Taiwan application Serial No. 105133434, filed Oct. 17, 2016, and Taiwan application Serial No. 105134040, filed Oct. 21, 2016, the subject matters of which are incorporated herein by references.

TECHNICAL FIELD

The disclosure relates to a decoding device for absolute positioning code and the decoding method applied thereto.

BACKGROUND

Optical encoders (such as rotary encoder and optical scale, optical scale will be used for representing optical encoders throughout the following description) may be divided into incremental output and absolute output according to the output data type. The absolute output optical scale has the advantages of capability of reading the absolute position, no accumulation error incurred, and not losing the position information after power off. The absolute output optical scales are widely used in computerized numerical control (CNC), servo drive, robots, and devices where displacement information needs to be measured. The signal obtained by the optical scale requires an appropriate decoder to extract position information of the device under test. There is a need for a decoding device and a decoding method that can be applied to the absolute output type optical scales.

SUMMARY

The disclosure relates to a decoding device for absolute positioning code and the decoding method applied thereto.

According to one embodiment, a decoding device for an absolute positioning code is provided. The decoding device includes a linear feedback shift register, a lookup table circuit, a counter circuit, and a computation circuit. The linear feedback shift register includes n registers. The n registers load the absolute positioning code with a first frequency. The linear feedback shift register performs shifting operation according to a clock signal having a second frequency greater than or equal to the first frequency. The lookup table circuit is configured to output a lookup result and a valid flag according to values stored in the n registers. The lookup result has k different data, $k \leq (2^n - 1)$, and the valid flag indicates whether the lookup result is valid. The counter circuit is configured to reset according to the valid flag, and to perform counting operation according to the clock signal to generate a counting result. The computation circuit is configured to perform calculation according to the lookup result and the counting result to generate a decoding result when the valid flag indicates valid.

According to another embodiment, a decoding method for an absolute positioning code is provided. The method includes the following steps. Provide a linear feedback shift register including n registers, wherein the n registers load an absolute positioning code with a first frequency. Perform, by the linear feedback shift register, shifting operation according to a clock signal having a second frequency greater than or equal to the first frequency. Output, by a lookup table, a lookup result and a valid flag according to values stored in the n registers, wherein the lookup result has k different data, $k \leq (2^n - 1)$, and the valid flag indicates whether the lookup result is valid. Perform counting operation according to the clock signal to generate a counting result, wherein the counting result is reset according to the valid flag. Perform calculation according to the lookup result and the counting result to generate a decoding result when the valid flag indicates valid.

BRIEF DESCRIPTION OF THE DRAWINGS

FIG. 7 shows a diagram illustrating sampling with a fixed interval from the data sequence generated by the LFSR according to an embodiment of this disclosure.

FIG. 8 shows a diagram illustrating an example data corresponding relationship in a lookup table circuit according to an embodiment of this disclosure.

FIG. 9 shows a diagram illustrating an example truth table of the lookup table circuit according to an embodiment of this disclosure.

Figure 1A:
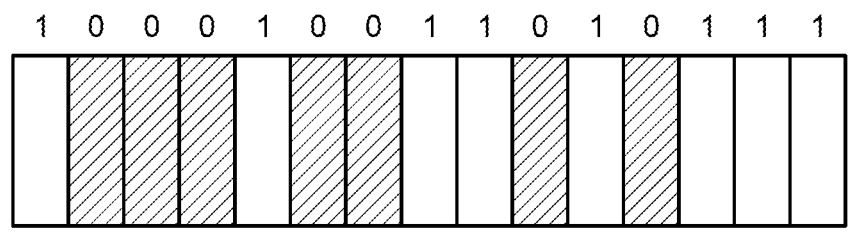
FIG. 1A shows a diagram of an example single track absolute output type optical linear scale.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The absolute output type optical scale uses multiple photoelectric sensors to obtain position information. Considering noise suppression, determination of rotating direction, reading mistake prevention for better reliability, the absolute output type optical scale commonly adopts multiple tracks Gray code encoding mechanism. The main difference between Gray code and a generic binary code is that neighboring codes of Gray code differ in only one bit, hence preventing reading mistakes.

However, by arranging Gray code in multiple tracks, even if a minor deflection angle is introduced, a phase error may occur in the read head signal, resulting in a position read error. A single track absolute output type optical scale has been developed accordingly. Scales on the single track absolute output type optical scale may be encoded according to the maximum length sequence (MLS). MLS is a pseudorandom binary sequence, and may be generated by a linear feedback shift register (LFSR). For an optical scale using LFSR encoders, the decoding device may also use a LFSR to recover the position information.

Figure 1B:
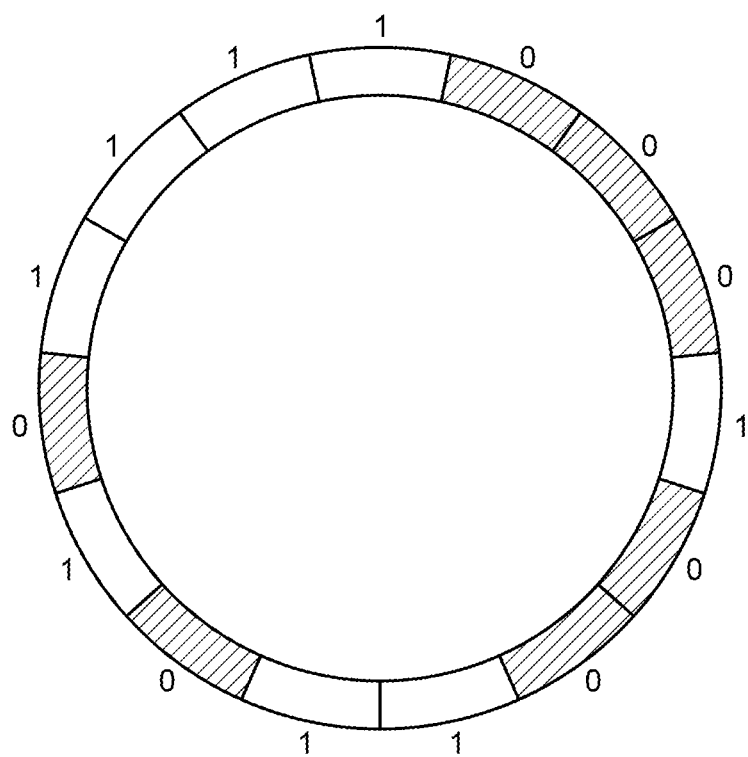
FIG. 1B shows a diagram of an example single track absolute output type optical circular scale.

Implementation of the single track absolute output type optical scale includes a linear scale and a circular scale. FIG. 1A shows a diagram of an example single track absolute output type optical linear scale. FIG. 1B shows a diagram of an example single track absolute output type optical circular scale. The pseudorandom binary sequence generated by the LFSR is sequentially marked on the optical scale. 0 and 1 may be defined by different degrees of light transmission. For example, a transparent region may be defined as 1, and an opaque region may be defined as 0. A light source and a light sensor array may be disposed on the opposite sides of the optical scale. The data read by the light sensor array may be further decoded to obtain the absolute position of the optical scale. As shown in FIG. 1A and FIG. 1B, the light sensor array may read neighboring codes on the scale by receiving light and obtain the absolute position correspondingly. The linear scale may be used for measuring displacement. The circular scale may be disposed on a disc rotating around a shaft and may be used for measuring rotation amount of the device under test.

As the requirement for the position resolution increases or the measurement distance increases, the length of code for the optical scale needs to be increased. In other words, more bits are required in the MLS. For a MLS that has a large number of bits, a decoding device that merely uses the LFSR may spend too much time recovering the position information. Furthermore, the LFSR in the decoding device have to match the MLS marked on the optical scale. The cost for manufacturing the read head can be reduced if a read head structure capable of reading multiple versions of sequences on different optical scales can be developed.

Another approach for decoding the absolute positioning code is to use a lookup table (LUT). Each code of the MLS marked on the optical scale may be corresponding to a single order signal, such that when the decoding device acquires the order signal, the decoding device can immediately know the relative position between the optical read head and the scale. Multiple photoelectric sensors may be installed in the optical read head to read signals of the MLS on the scale, and the data read may be sent to the address bus of the LUT. When the LUT acquires a valid address, the LUT may immediately output corresponding data on the data bus. This LUT approach also suffers from increased length of the optical scale and the increased number of bits in the MLS, which causes the LUT capacity to increase significantly and thus occupies too much memory space and hardware area. Such LUT makes the compact read head manufacture difficult and increases the manufacture cost.

The operation of an example LFSR is described here first. The LFSR includes multiple registers. The feature of the LFSR is that inputs of the registers are based on a linear function of the previous states of outputs of the registers. The linear function in the LFSR may be implemented by XOR logic gates. The initial values of the registers may be referred to as the "seed." Because the operation of the LFSR is deterministic, the data flow generated by the LFSR may be determined by the current state or the previous state. In addition, the number of possible states in the LFSR is finite. The sequence generated by the LFSR may create a cycle. By selecting an appropriate predetermined polynomial, the sequence generated by the LFSR looks like a random sequence, which repeats with a long period.

Specifically, the LFSR changes the polynomial according to the feedback positions of the XOR logic gates, which may also be called tap positions. For a LFSR including n registers (n is a positive integer), if the tap positions of the LFSR correspond to a primitive polynomial and the initial state of the registers are not all 0, a MLS with length ($2^n-1$) can be created. When a seed is obtained, the location of the seed in the data flow generated by the LFSR can be found by shifting operation of the LFSR and counting operation.

Figures 2A, 2B:
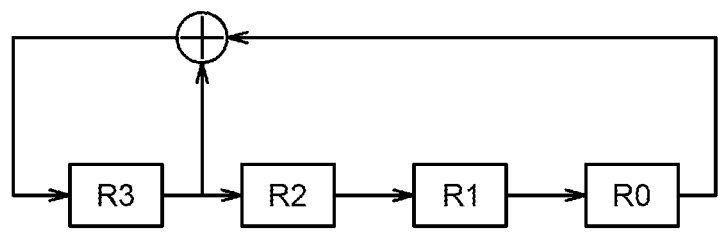
FIG. 2A shows an example of a linear feedback shift register.
FIG. 2B shows an example data sequence generated by the linear feedback shift register shown in FIG. 2A.

FIG. 2A shows an example of a linear feedback shift register. The LFSR including four registers are depicted as an example. As shown in FIG. 2A, the next state of the register R3 is a logical XOR operation performed on the current state of the register R0 and the current state of the register R3. The primitive polynomial shown in FIG. 2A is ($x^4+x^3+1$). FIG. 2B shows an example data sequence generated by the linear feedback shift register shown in FIG. 2A. The LFSR with length 4 is able to generate a MLS with length equal to ($2^4-1$)=15. A right shift implementation is shown in FIG. 2A as an example. In another embodiment, the LFSR may also adopt left shift architecture. The operation is similar and thus is not repeated here.

As described above, for detecting an optical scale having a large length, decoding by a LFSR may be too slow, and decoding by a LUT may require too much hardware area which may increase production cost. A hybrid decoding structure is proposed in this disclosure, saving both the computation time and the hardware area.

Figure 3:
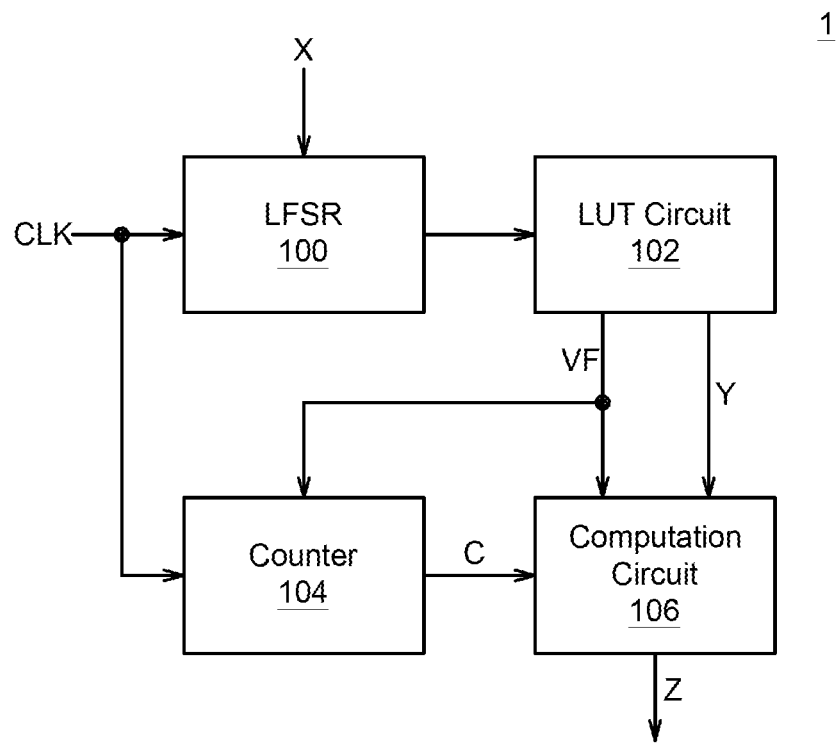
FIG. 3 shows a diagram illustrating a decoding device according to an embodiment of this disclosure.

FIG. 3 shows a diagram illustrating a decoding device according to an embodiment of this disclosure. The decoding device 1 includes a linear feedback shift register 100, a lookup table circuit 102, a counter circuit 104, and a computation circuit 106. The linear feedback shift register 100 includes n registers. The n registers load the absolute positioning code X with a first frequency $f_1$. The linear feedback shift register 100 performs shifting operation according to a clock signal CLK having a second frequency $f_2$ greater than or equal to the first frequency $f_1$. The lookup table circuit 102 is configured to output a lookup result Y and a valid flag VF according to values stored in the n registers. The lookup result Y has k different data, k≤($2^n-1$), and the valid flag VF indicates whether the lookup result Y is valid. The counter circuit 104 is configured to reset according to the valid flag VF, and to perform counting operation according to the clock signal CLK to generate a counting result C. The computation circuit 106 is configured to perform calculation according to the lookup result Y and the counting result C to generate a decoding result Z when the valid flag VF indicates valid.

The linear feedback shift register 100 includes n registers. The registers may be implemented by D flip-flops with preset function. The linear feedback shift register 100 may load the absolute positioning code X from the optical sensors as the initial values of the n registers by presetting the D flip-flops. The absolute positioning code X includes for example n bits. The loading operation of the absolute position code X may be performed with the first frequency $f_1$, which may be related to the optical measurement frequency. For example, for a moving speed 20 m/s with variation period 10 μm, the first frequency $f_1$ may be set as 2 MHz. That is, the operation bandwidth of the decoding device 1 has to be larger than 2 MHz. In implementation, the actual positioning information may be captured by the optical sensors with an exposure frequency $f_E$. The exposure frequency $f_E$ may be larger than the first frequency $f_1$, such as being ten times of the first frequency $f_1$. A control signal having a control frequency fc may be provided to determine whether each captured positioning code (according to the exposure frequency $f_E$) is to be loaded into the linear feedback shift register 100. For example, the linear feedback shift register 100 may be configured to load the absolute positioning code X when the pulse in the control signal triggers. In other words, the first frequency $f_1$ may be adjusted based on the control frequency fc in implementation to control when the absolute positioning code X is loaded.

The lookup table circuit 102 may perform lookup operation according to the values stored in the n registers. The lookup table circuit 120 may store "part" of the data sequence generated by the linear feedback shift register 100. For example, the linear feedback shift register 100 may generate the MLS with length $(2^n-1)$, the lookup table circuit 102 may store the complete $(2^n-1)$ data, or the lookup table circuit 102 may store corresponding position information of k data among the $(2^n-1)$ data, $k \leq (2^n-1)$. In this case, after the linear feedback shift register 100 loads the absolute positioning code X, it is possible that the lookup table circuit 102 cannot find a lookup result corresponding to the absolute positioning code X. Therefore the lookup table circuit 102 may further include an output pin: the valid flag VF, which indicates whether the current output lookup result Y is valid or not.

Because the lookup table circuit 102 may be configured to store only part of the position information corresponding to the MLS, the hardware area required for the lookup table circuit 102 can be reduced. If the lookup table circuit 102 can find position information corresponding to the absolute positioning code X, the decoding process is complete. On the other hand, if the lookup table circuit cannot find position information corresponding to the absolute positioning code X, the output valid flag VF indicates invalid. The computation circuit 106 does not output a result at this moment, the decoding process has not completed yet. In this case, the linear feedback shift register 100 and the counter circuit 104 may participate in the subsequent decoding process.

When the valid flag VF indicates invalid, the linear feedback shift register 100 may perform shifting operation according to the clock signal CLK to make then registers switch to the next state. Based on the values after the shifting operation, lookup operation may be conducted again. Such shifting operation may be repeated until the lookup table circuit 102 successfully finds the corresponding position information and the valid flag VF indicates valid. In the meantime, the counter circuit 104 performs counting operation to obtain the counting result C, calculating how many shifting operations have been performed in the above described process. The counting result C represents how many shifting operations are required from the starting absolute positioning code X to successfully find corresponding data in the lookup table circuit 102 to generate a valid lookup result Y.

In other words, a difference amount exists between the actual position information corresponding to the absolute position code and the lookup result Y, and the difference amount is equal to the counting result C. Thus, when the valid flag VF indicates valid, the computation circuit 105 may perform calculation, such as addition operation (or subtraction operation) according to the lookup result Y and the counting result C to generate the decoding result Z. An example addition operation includes adding the lookup result Y (or a shifted version of the lookup result Y, or a multiple of the lookup result Y) to the counting result C to generate the decoding result Z. The decoding process ends when the valid flag VF indicates valid, and hence the counter circuit 104 may reset, such as resetting the counting result C to zero to facilitate the next decoding process.

As described above, each decoding process may involve several shifting operations in the linear feedback shift register 100 and several counting operations in the counter circuit 104. Thus, the second frequency $f_2$ of the clock signal CLK upon which the linear feedback shift register 100 and the counter circuit 104 rely should be greater than or equal to the first frequency $f_1$ with which the linear feedback shift register 100 loads the absolute positioning code X. The relationship between the first frequency $f_1$ and the second frequency $f_2$ may be dependent on the interval between the data stored in the lookup table circuit 102. If the data stored in the lookup table circuit 102 have larger interval within the pseudorandom sequence, more shifting operations (by the linear feedback shift register 100) and more counting operations (by the counter circuit 104) are required, and hence the difference between the first frequency $f_1$ and the second frequency $f_2$ may be larger. On the contrary, if there are more data stored in the lookup table circuit 102, the data then have smaller interval within the pseudorandom sequence, the difference between the first frequency $f_1$ and the second frequency $f_2$ may be smaller. In one embodiment, the interval between the data stored in the lookup table circuit 102 may be determined based on the operation speed of the lookup table circuit 102.

For example, if the first frequency $f_1$ is 2 MHz, and the operation speed of the lookup table circuit 102 is 400 MHz, the interval between the data stored in the lookup table circuit 102 may be set as 50-100 considering the hardware constraint and safety factor range. That is, the number of shifting operations performed by the linear feedback shift register 100 is at most 50-100 to successfully find the corresponding position information in the lookup table circuit 102.

Figure 12:
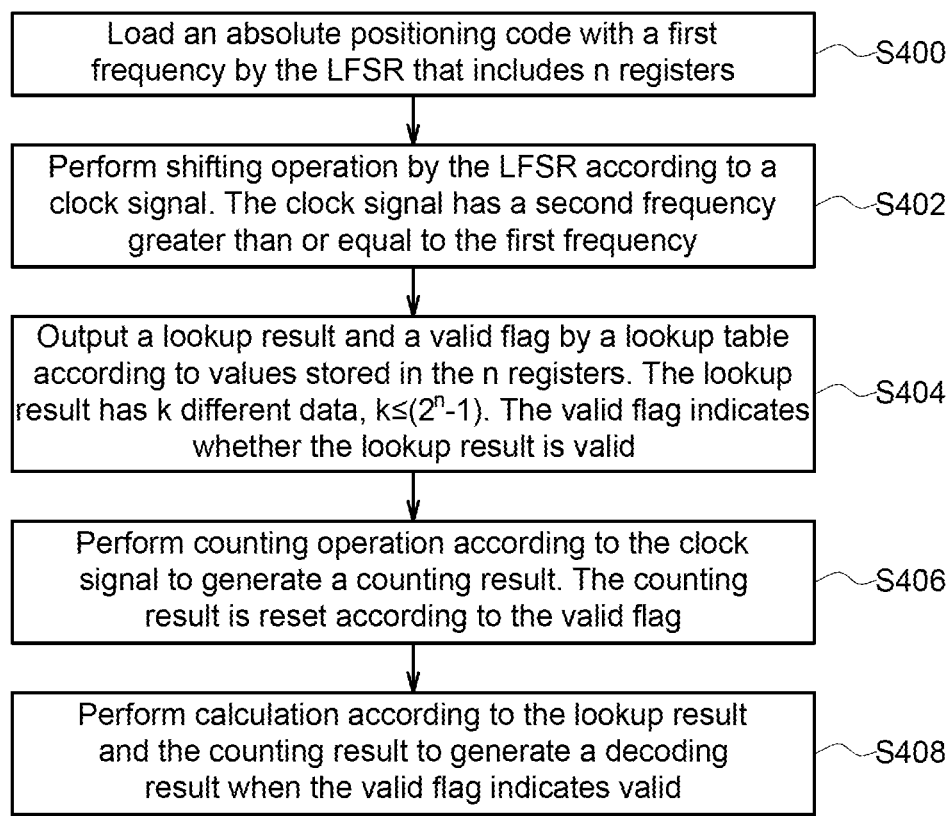
FIG. 12 shows a flowchart illustrating a decoding method according to an embodiment of this disclosure.

The decoding method adopted by the decoding device 1 shown in FIG. 3 may be referred to in FIG. 12, which shows a flowchart illustrating a decoding method according to an embodiment of this disclosure. The decoding method includes the following steps. Step S400: Provide a linear feedback shift register including n registers, wherein the n registers load an absolute positioning code X with a first frequency $f_1$. Step S402: Perform shifting operation by the linear feedback shift register according to a clock signal CLK. The clock signal CLK has a second frequency $f_2$ greater than or equal to the first frequency $f_1$. Step S404: Output a lookup result Y and a valid flag VF by a lookup table according to values stored in the n registers. The lookup result Y has k different data, $k \leq (2^n-1)$. The valid flag VF indicates whether the lookup result is valid. Step S406: Perform counting operation according to the clock signal CLK to generate a counting result C. The counting result C is reset according to the valid flag VF. Step S408: perform calculation according to the lookup result Y and the counting result C to generate a decoding result Z when the valid flag VF indicates valid.

According to the decoding device in FIG. 3 and the decoding method in FIG. 12, the advantages of small hardware area of the LFSR and the fast speed of the LUT can be combined. Because the LUT stores the partial data, the hardware area can be saved. For the data not stored in the LUT, the LFSR performs shifting operation until the data can be found. Generally speaking, the operation speed of the LUT is much faster than the decoding speed requirement for an optical scale. By using a LUT with smaller capacity and a LFSR that may spend a certain amount of time on shifting operation, the required decoding speed is hardly affected and the hardware cost can be greatly reduced. In addition, the proposed architecture provides flexibility in circuit design. If the circuit provides more space, the LUT may be given larger capacity to speed up the operation. On the other hand, if the requirement on the decoding speed is low, the LFSR can be assigned with a larger length to reduce the circuit area required by the LUT. Consequently the proposed decoding device and decoding method are flexible in design and suitable for optical scales for various applications.

Figure 4:
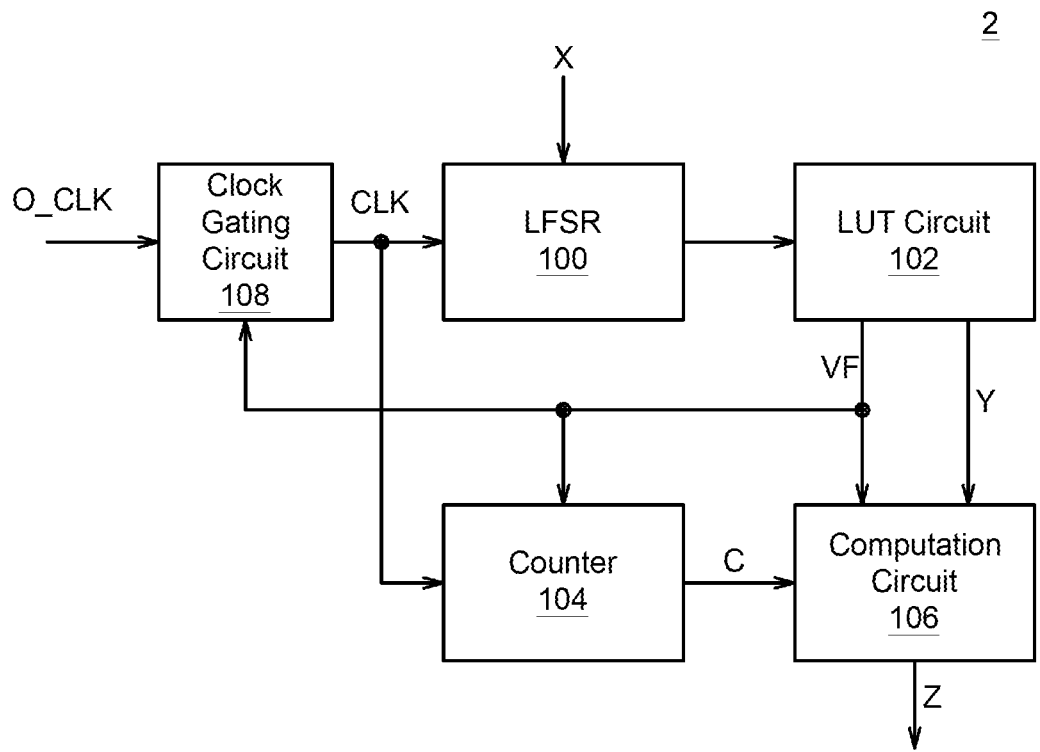
FIG. 4 shows a diagram illustrating a decoding device according to another embodiment of this disclosure.

FIG. 4 shows a diagram illustrating a decoding device according to another embodiment of this disclosure. As compared to the embodiment shown in FIG. 3, the decoding device 2 further includes a clock gating circuit 108. The clock gating circuit 108 is configured to generate a gated clock signal according to an original clock signal O_CLK and the valid flag VF, and to provide the gated clock signal as the clock signal CLK that is sent to the linear feedback shift register 100 and the counter circuit 104. The clock gating circuit 108 may stop outputting the clock when the valid flag VF indicates valid (representing the decoding process ends), such that the clock signal CLK stops oscillating. The linear feedback shift register 100 thus does not perform shifting operation, and the counter circuit 104 stops counting operation accordingly. The architecture shown in FIG. 4 guarantees that the decoding device 2 functions correctly. Moreover, because the linear feedback shift register 100 and the counter circuit 104 enter a sleep mode after the decoding process ends, power consumption can be saved effectively.

In one embodiment, the tap positions and the bit length of the linear feedback shift register 100 may be controlled flexibly. For example, the linear feedback shift register 100 is configured to change a bit length according to a first control data A, and to change a tap position (effectively changing the polynomial) according to a second control data B. By using such linear feedback shift register 100 with built-in flexibility, one read head hardware design may be applied to various versions of scale patterns. In other words, a single hardware can meet various applications requiring different lengths or different resolutions. The LFSR circuit may be implemented by Galois structure or Fibonacci structure. The related circuit implementation of tap position control and bit length control under these two types of structures are given below.

Figure 5A:
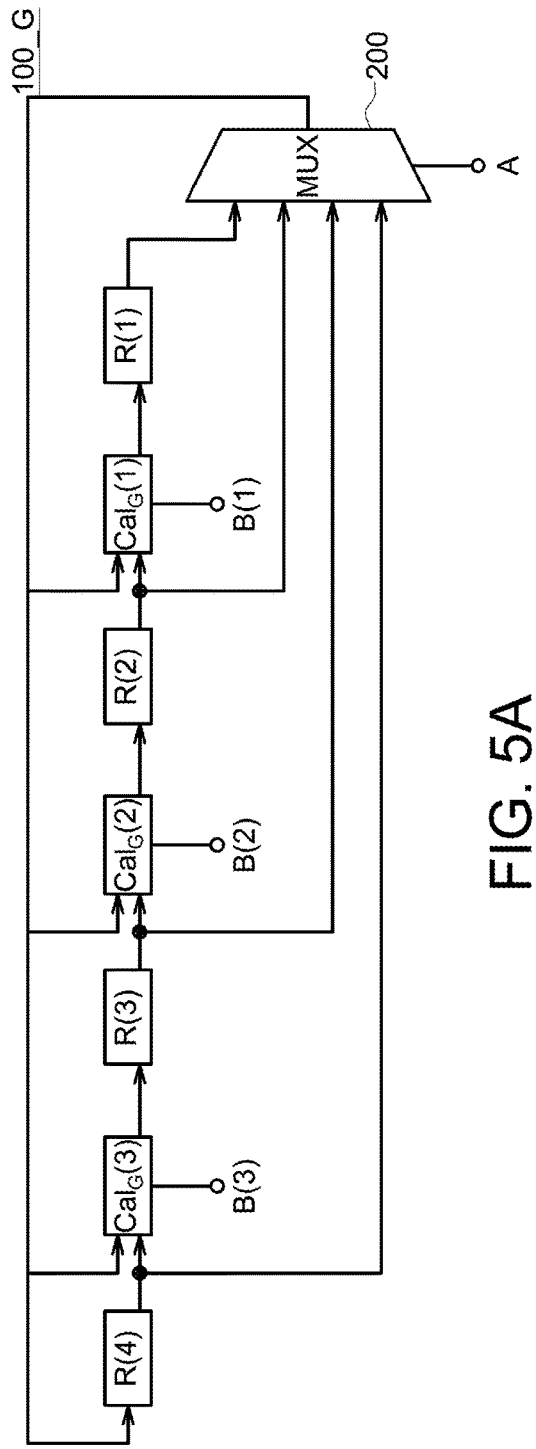
FIG. 5A shows a diagram illustrating a flexible linear feedback shift register according to an embodiment of this disclosure.

FIG. 5A shows a diagram illustrating a flexible linear feedback shift register according to an embodiment of this disclosure. A right shift Galois structure and n=4 is used in this example. The linear feedback shift register 100_G includes n registers R(1)-R(n), a feedback multiplexer (MUX) 200, (n−1) calculation logic circuits $Cal_G(1)$-$Cal_G(n-1)$. The feedback multiplexer 200 has multiple input terminals, a selection control terminal, and an output terminal. The selection control terminal of the feedback multiplexer 200 is coupled to the first control data A, and the multiple input terminals of the feedback multiplexer 200 are coupled to output terminals (for example, pin Q of a D flip-flop) of the n registers R(1)-R(n) respectively. The $(i)^{th}$ ($1 \leq i \leq n-1$) calculation logic circuit $Cal_G(i)$ is configured to selectively couple an input terminal (for example, pin D of a D flip-flop) of the $(i)^{th}$ register to one of the following terminals according to the $(i)^{th}$ bit of the second control data B: the output terminal of the feedback multiplexer 200, the output terminal of the $(i+1)^{th}$ register R(i+1), and a result of a logical XOR operation performed on the output terminal of the feedback multiplexer 200 and the output terminal of the $(i+1)^{th}$ register R(i+1).

Figure 5B:
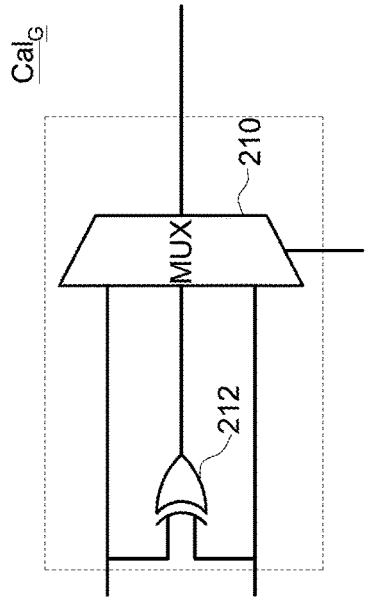
FIG. 5B shows a diagram illustrating a calculation logic circuit as shown in FIG. 5A.

FIG. 5B shows a diagram illustrating a calculation logic circuit as shown in FIG. 5A. FIG. 5B shows an example implementation, and the invention is not limited thereto. In this example, the calculation logic circuit $Cal_G$ includes a multiplexer 210 and an XOR logic gate 212. The multiplexer 210(i) of the $(i)^{th}$ calculation logic circuit $Cal_G(i)$ selects one of the three inputs to be output according to the $(i)^{th}$ segment B(i) (which may include multiple bits) of the second control data B.

According to the example shown in FIG. 5A, the second control data B determines whether the input of each register is directly connected to the previous register or a feedback signal after XOR operation. In other words, the second control data B controls the tap positions of the LFSR, and determines the polynomial used by the LFSR. The bit width of the first control data A may be dependent on the number of inputs of the feedback multiplexer 200. Take n=4 for example, the feedback multiplexer 200 is a 4-to-1 MUX, the first control data A may be a 2-bit control signal to select one among four inputs. The feedback multiplexer 200 determines at which register the feedback is made, thus determines the number of registers connected in series. Therefore, the linear feedback shift register 100_G shown in FIG. 5A changes the bit length according to the first control data A, and changes the tap positions according to the second control data B.

Figure 6A:
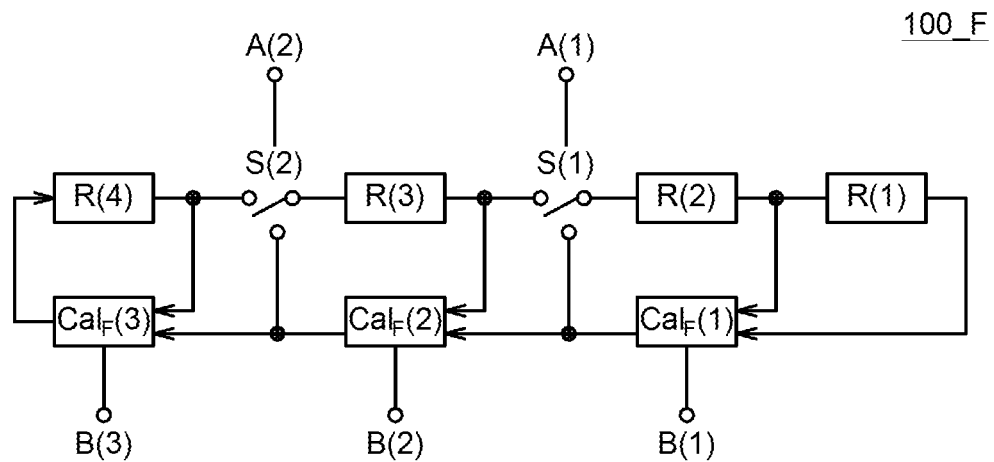
FIG. 6A shows a diagram illustrating a flexible linear feedback shift register according to another embodiment of this disclosure.

FIG. 6A shows a diagram illustrating a flexible linear feedback shift register according to another embodiment of this disclosure. A right shift Fibonacci structure and n=4 is used in this example. The linear feedback shift register 100_F includes n registers R(1)-R(n), (n−1) calculation logic circuits $Cal_F(1)$-$Cal_F(n-1)$, and (n−2) switches S(1)-S(n−2).

Figure 6B:
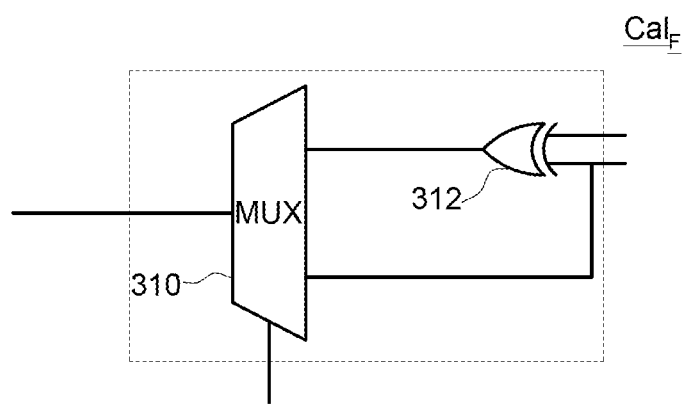
FIG. 6B shows a diagram illustrating a calculation logic circuit as shown in FIG. 6A.

FIG. 6B shows a diagram illustrating a calculation logic circuit as shown in FIG. 6A. The $(i)^{th}$ calculation logic circuit $Cal_F(i)$ includes a multiplexer 310(i) and an XOR logic gate 312(i). The multiplexer 310(i) has a first input terminal, a second input terminal, a selection control terminal, and an output terminal. The XOR logic gate 312(i) has a first input terminal, a second input terminal, and an output terminal. The first input terminal of the multiplexer 310(i) is coupled to the output terminal of the XOR logic gate 312(i), the second input terminal of the multiplexer 310(i) is coupled to the second input terminal of the XOR logic gate 312(i), the selection control terminal of the multiplexer 310(i) is coupled to the $(i)^{th}$ segment B(i) (which may be a single bit) of the second control data B, and the first input terminal of the XOR logic gate 312(i) is coupled to the output terminal of the $(i+1)^{th}$ register R(i+1).

The $(i)^{th}$ switch S(i) is configured to selectively couple an input terminal of the $(i+1)^{th}$ register R(i+1) to one of the following terminals according to the $(i)^{th}$ segment A(i) (which may be a single bit) of the first control data A: the output terminal of the $(i+2)^{th}$ register R(i+2), and the output terminal of the multiplexer 310(i) of the $(i)^{th}$ calculation logic circuit $Cal_F(i)$. The second input terminal of the XOR logic gate 312(i) of the $(i)^{th}$ calculation logic circuit $Cal_F(i)$ is coupled to the output terminal of the $(i)^{th}$ register R(i) if i=1. The second input terminal of the XOR logic gate 312(i) of the $(i)^{th}$ calculation logic circuit $Cal_F(i)$ is coupled to the output terminal of the multiplexer of the $(i-1)^{th}$ calculation logic circuit $Cal_F(i-1)$ if $2 \le i \le n-1$.

According to the example shown in FIG. 6A, the second control data B determines whether the output of each register passes through the XOR operation on the feedback path (formed by connecting the calculation logic circuit $Cal_F$ in series). In other words, the second control data B controls the tap positions of the LFSR, and determines the polynomial used by the LFSR. The first control data A controls where the registers break connection and where feedback is made. In other words, the first control data A controls the number of registers connected in series. Therefore, the linear feedback shift register 100_F shown in FIG. 6A changes the bit length according to the first control data A, and changes the tap positions according to the second control data B.

In Fibonacci structure, the feedback path formed by the calculation logic circuit $Cal_F$ includes multiple XOR logic gates connected in series, which constitutes the critical path in the circuit. Such calculation path exists between the first register and the last register. In contrast, in Galois structure, at most one calculation logic circuit $Cal_G$ (including a single XOR logic gate) exists between each pair of adjacent registers, and hence the critical path is shorter as compared to that in Fibonacci structure, making it possible for the circuit to operate in a higher frequency. Consequently, the LFSR with Galois structure may be adopted for high speed applications.

Data stored in the lookup table circuit 102 are described below. FIG. 7 shows a diagram illustrating sampling with a fixed interval from the data sequence generated by the LFSR according to an embodiment of this disclosure. Take n=4 for example, the length of the MLS generated by the LFSR using a primitive polynomial is equal to 15 ($2^4-1$). The position information corresponding to each code in the MLS is shown in FIG. 7. The position information is arranged sequentially from 0001 to 1111. The lookup table circuit 102 may store part of the table shown in FIG. 7. For example, the k different data stored in the lookup table circuit 102 may be sampled from the ($2^n-1$) data with a fixed interval m. According to the example shown in FIG. 7, the fixed interval m=4. The lookup table circuit 102 is able to successfully find the position information corresponding to the absolute positioning codes {1000}, {0111}, {1101}, and {0100} (the dark boxes shown in FIG. 7). If the values stored in the registers in the LFSR do not belong to these four codes, the lookup table circuit 102 cannot find the corresponding position information, and the output valid flag VF indicates invalid.

Following the example in FIG. 7, FIG. 8 shows a diagram illustrating an example data corresponding relationship in a lookup table circuit according to an embodiment of this disclosure. Because the lookup table circuit 102 stores only four data, the corresponding position information does not have to be stored in full bit width. In this example, only the two most significant bits (MSB) are stored to effectively represent four different data, as shown in the data column in FIG. 8. When decoding, after obtaining the lookup result Y, the lookup result Y may be left-shifted by two bits, and 01 is added to the two least significant bits (LSB) to recover the original position information.

In one embodiment, the length of the fixed interval is $2^p$, where p is a positive integer smaller than n. According to the examples shown in FIG. 7 and FIG. 8, n=4, p=2. The advantage of sampling with the fixed interval $2^p$ is that the p least significant bits can be truncated directly. Refer to the example shown in FIG. 8, the p least significant bits of the position information are truncated. The lookup result Y can be left-shifted by p bits when decoding. The lost information due to truncated p bits may be supplemented by the counter circuit 104. The counter circuit 104 may be a p-bit counter. The computation circuit 106 may be configured to left shift the lookup result Y by p bits, and then add the p-bit counting result C generated by the counter circuit 104 to obtain the decoding result Z.

By sampling with the fixed interval $m=2^p$ as examples shown in FIG. 7 and FIG. 8, the size of the lookup table can be reduced to $$\frac{1}{m}$$

times of the original size. The more the p-bits to be truncated, the smaller the size of the lookup table is. For example, for an optical scale with $2^{12}$ scales, by sampling with a fixed interval $m=2^4$ the size of the lookup table can be reduced to 1/16 times, reducing the circuit area significantly. Of course the sampling interval m set as power of 2 is merely a demonstrating example. In implementation the value m may also be set as other positive integers, such as 10, 50, 100, and so on. When decoding, the computation circuit 106 may multiply the lookup result Y by m, and then add the counting result C generated by the counter circuit 104 to obtain the decoding result Z.

The lookup table circuit 102 is configured to output the lookup result Y and the valid flag VF. There may be several circuit implementations for the lookup table circuit 102. For example, the lookup table circuit 102 may include a judgment circuit. The lookup result Y is set as a default output value Q when the lookup table circuit 102 cannot find a corresponding lookup table entry based on the values stored in the n registers. The judgment circuit is configured to determine whether or not the default output value Q equals the lookup result Y to generate the valid flag VF. In another embodiment, the lookup result Y is set the same as the previous lookup result Y in the previous clock cycle when the lookup table circuit 102 cannot find a corresponding lookup table entry based on the values stored in the n registers.

The lookup table circuit 102 may be implemented by memory circuits. Refer to the example shown in FIG. 8, the memory address may be input to acquire the corresponding data. Because the data stored in the lookup table circuit 102 are discontinuous data after the sampling procedure, the address may be arranged irregularly. Further, the bit width of the input address and the bit width of the output data may differ. Therefore in one embodiment, the lookup table circuit 102 may be implemented by a combinational logic circuit.

FIG. 9 shows a diagram illustrating an example truth table of the lookup table circuit according to an embodiment of this disclosure. This table is constructed according to the examples shown in FIG. 7 and FIG. 8. The valid flag VF is set 1 for sampled data (dark boxes in FIG. 7), and the corresponding lookup results Y are shown in FIG. 8. The valid flag VF is set 0 for other data, and the corresponding lookup results may be x (don't care terms). The truth table shown in FIG. 9 illustrates relationship between four inputs and three outputs (including two bits of the lookup result Y and one bit of the valid flag VF). The corresponding combinational circuit may be realized by logic synthesis techniques, where logic gate count optimization may be accomplished by exploiting the don't care terms. A combinational circuit does not have memory effect and its output result depends on the current input. The hardware implementation may be designed for specific lookup table to save circuit area.

Figure 10:
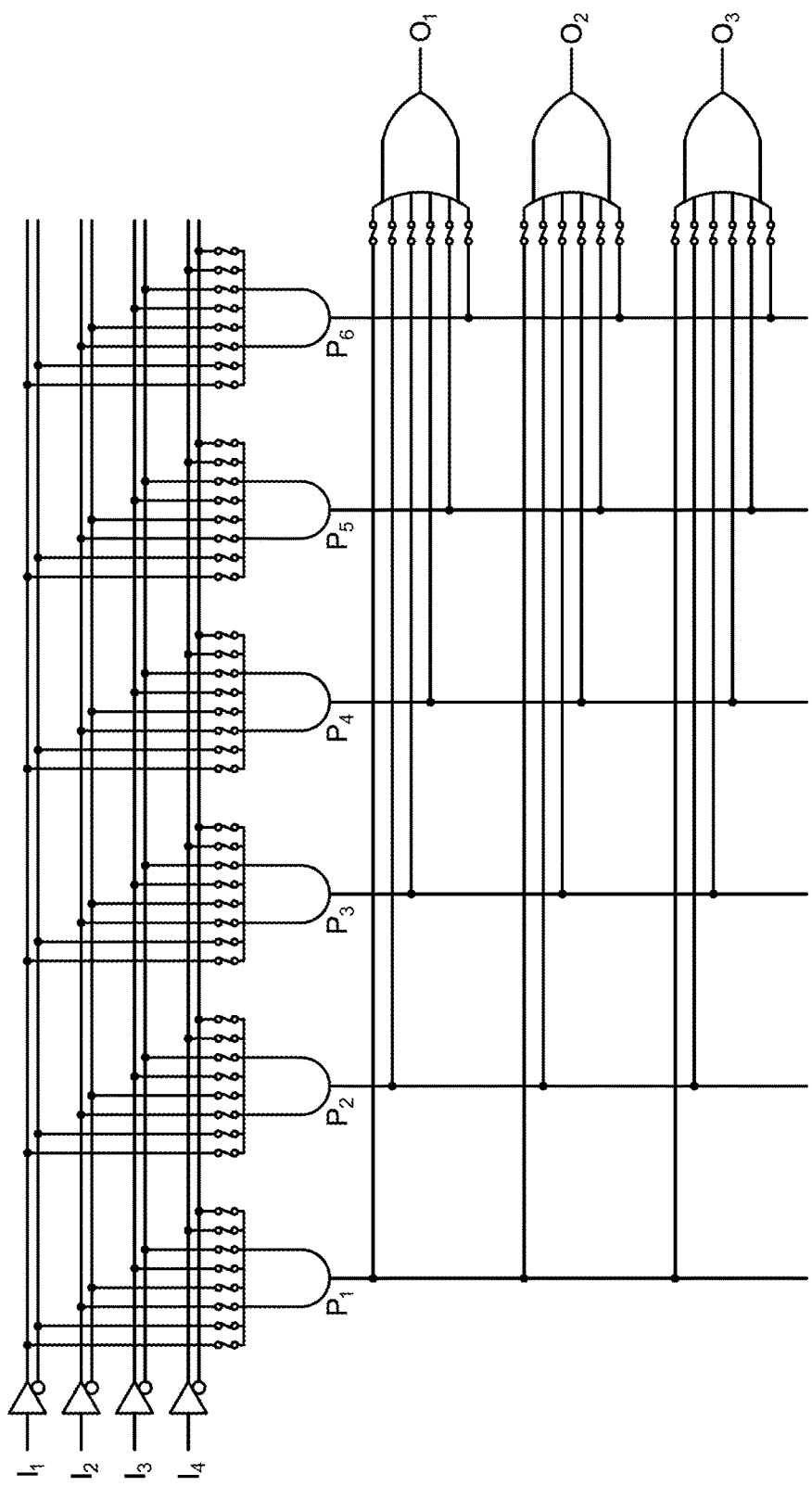
FIG. 10 shows a diagram illustrating an example implementation of the lookup table circuit according to an embodiment of this disclosure.

In one embodiment, the lookup table circuit 102 may be implemented by a programmable logic array (PLA), which is capable of realizing several different relationships between the multiple inputs (lookup table address) and the outputs (lookup result Y and valid flag VF). FIG. 10 shows a diagram illustrating an example implementation of the lookup table circuit according to an embodiment of this disclosure. The PLA is capable of realizing various combinational logics. The switches in the example shown in FIG. 10 may be controlled according to the actual lookup table.

Figure 11:
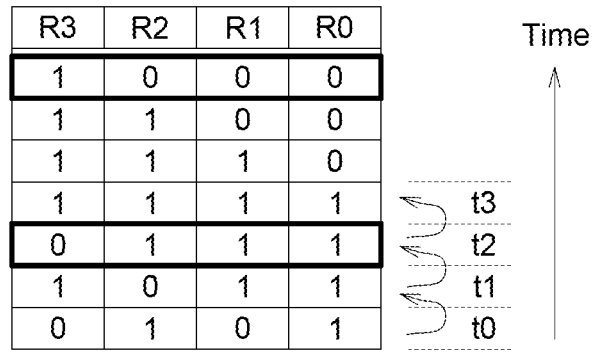
FIG. 11 shows a diagram illustrating an example decoding process according to an embodiment of this disclosure.

An example is given below to demonstrate the timing order of the decoding device and the decoding method proposed in this disclosure. FIG. 11 shows a diagram illustrating an example decoding process according to an embodiment of this disclosure. At time t0, the absolute positioning code X loaded by the linear feedback shift register 100 is 0101. The lookup table circuit 102 cannot find the corresponding data, the valid flag indicates invalid. The linear feedback shift register 100 performs shifting operation, and the counter circuit 104 starts counting. At time t1, the shifted value stored in the linear feedback shift register 100 is 1011, which still cannot be found in the lookup table circuit 102. The valid flag VF still indicates invalid, and the counting result C is now 1.

At time t2, the shifted value stored in the linear feedback shift register 100 becomes 0111, which can be successfully found in the lookup table circuit 102. The corresponding lookup result Y is for example 01, and the counting result C is now 2. The valid flag VF indicates valid. The computation circuit 106 left shifts the lookup result Y by two bits (or multiplies by four), appends the originally truncated two bits ("01"), and adds the counting result C=2 to generate the decoding result Z=0111 (left shift the lookup result Y 01 by two bits and append 01->0101, add C=2 (0010 in binary representation)->0111. Refer to FIG. 7, when the absolute positioning code X is 0101, the corresponding position information is 0111).

Now the decoding process is complete, the computation circuit 106 has successfully output the decoding result Z, and hence the computation circuit 106 may be configured to control the output not to be affected by subsequent circuit operations. As the embodiment shown in FIG. 4, the decoding device 2 includes a clock gating circuit 108, which may be configured to stop oscillating the clock signal starting from time t3, such that the linear feedback shift register 100 and the counter circuit 104 stop working. The correctness of the circuit can be guaranteed, and the power consumption can be saved as well.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A decoding device for an absolute positioning code, comprising:
    a linear feedback shift register, comprising n registers, wherein the n registers load the absolute positioning code with a first frequency, and the linear feedback shift register performs shifting operation according to a clock signal having a second frequency greater than or equal to the first frequency;
    a lookup table circuit, configured to output a lookup result and a valid flag according to values stored in the n registers, wherein the lookup result has k different data, $k \leq (2^n-1)$, and the valid flag indicates whether the lookup result is valid;
    a counter circuit, configured to reset according to the valid flag, and to perform counting operation according to the clock signal to generate a counting result; and
    a computation circuit, configured to perform calculation according to the lookup result and the counting result to generate a decoding result when the valid flag indicates valid.

2. The decoding device according to claim 1, further comprising a clock gating circuit, configured to generate a gated clock signal according to an original clock signal and the valid flag, and to provide the gated clock signal as the clock signal.

3. The decoding device according to claim 1, wherein the linear feedback shift register is configured to change a bit length according to a first control data, and to change a tap position according to a second control data.

4. The decoding device according to claim 3, wherein the linear feedback shift register further comprises:
    a feedback multiplexer, having a plurality of input terminals, a selection control terminal, and an output terminal, wherein the selection control terminal is coupled to the first control data, and the plurality of input terminals are coupled to output terminals of the n registers respectively; and
    (n−1) calculation logic circuits, wherein the $(i)^{th}$ calculation logic circuit is configured to selectively couple an input terminal of the $(i)^{th}$ register to one of the following terminals according to the $(i)^{th}$ bit of the second control data: the output terminal of the feedback multiplexer, the output terminal of the $(i+1)^{th}$ register, and a result of a logical XOR operation performed on the output terminal of the feedback multiplexer and the output terminal of the $(i+1)^{th}$ register.

5. The decoding device according to claim 3, wherein the linear feedback shift register further comprises:
    (n−1) calculation logic circuits, wherein the $(i)^{th}$ calculation logic circuit comprises a multiplexer and an XOR logic gate, the multiplexer has a first input terminal, a second input terminal, a selection control terminal, and an output terminal, the XOR logic gate has a first input terminal, a second input terminal, and an output terminal, the first input terminal of the multiplexer is coupled to the output terminal of the XOR logic gate, the second input terminal of the multiplexer is coupled to the second input terminal of the XOR logic gate, the selection control terminal of the multiplexer is coupled to the $(i)^{th}$ bit of the second control data, and the first input terminal of the XOR logic gate is coupled to the output terminal of the $(i+1)^{th}$ register; and
    (n−2) switches, wherein the $(i)^{th}$ switch is configured to selectively couple an input terminal of the $(i+1)^{th}$ register to one of the following terminals according to the $(i)^{th}$ bit of the first control data: the output terminal of the $(i+2)^{th}$ register, and the output terminal of the multiplexer of the $(i)^{th}$ calculation logic circuit;
    wherein the second input terminal of the XOR logic gate of the $(i)^{th}$ calculation logic circuit is coupled to the output terminal of the $(i)^{th}$ register if i=1, and the second input terminal of the XOR logic gate of the $(i)^{th}$ calculation logic circuit is coupled to the output terminal of the multiplexer of the $(i-1)^{th}$ calculation logic circuit if $2 \leq i \leq n-1$.

6. The decoding device according to claim 1, wherein the linear feedback shift register is configured to use a primitive polynomial to sequentially generate $(2^n-1)$ data, wherein the k different data is sampled from the $(2^n-1)$ data with a fixed interval.

7. The decoding device according to claim 6, wherein a length of the fixed interval is $2^p$, where p is a positive integer smaller than n.

8. The decoding device according to claim 1, wherein the lookup table circuit comprises a judgment circuit, the lookup result is set as a default output value when the lookup table circuit cannot find a corresponding lookup table entry based on the values stored in the n registers, and the judgment circuit is configured to determine whether or not the default output value equals the lookup result to generate the valid flag.

9. The decoding device according to claim 1, wherein the lookup table circuit is a combinational logic circuit.

10. The decoding device according to claim 1, wherein the computation circuit is configured to perform an addition operation on the lookup result and the counting result to generate the decoding result.

11. A decoding method for an absolute positioning code, comprising:
providing a linear feedback shift register, comprising n registers, wherein the n registers load an absolute positioning code with a first frequency;
performing, by the linear feedback shift register, shifting operation according to a clock signal having a second frequency greater than or equal to the first frequency;
outputting, by a lookup table, a lookup result and a valid flag according to values stored in the n registers, wherein the lookup result has k different data, $k \leq (2^n-1)$, and the valid flag indicates whether the lookup result is valid;
performing counting operation according to the clock signal to generate a counting result, wherein the counting result is reset according to the valid flag; and
performing calculation according to the lookup result and the counting result to generate a decoding result when the valid flag indicates valid.

12. The decoding method according to claim 11, further comprising:
generating a gated clock signal according to an original clock signal and the valid flag, and providing the gated clock signal as the clock signal.

13. The decoding method according to claim 11, further comprising:
changing a bit length of the linear feedback shift register according to a first control data; and
changing a tap position of the linear feedback shift register according to a second control data.

14. The decoding method according to claim 11, wherein the linear feedback shift register is configured to use a primitive polynomial to sequentially generate $(2^n-1)$ data, wherein the k different data is sampled from the $(2^n-1)$ data with a fixed interval.

15. The decoding method according to claim 14, wherein a length of the fixed interval is $2^p$, where p is a positive integer smaller than n.

16. The decoding method according to claim 11, wherein the lookup result is set as a default output value when a corresponding lookup table entry cannot be found based on the values stored in the n registers, and the decoding method further comprises determining whether or not the default output value equals the lookup result to generate the valid flag.

17. The decoding method according to claim 11, wherein the step of performing calculation according to the lookup result and the counting result to generate a decoding result comprises:
performing an addition operation on the lookup result and the counting result.

* * * * *